US011122104B2

(12) United States Patent
Lopez-Uricoechea et al.

(10) Patent No.: US 11,122,104 B2
(45) Date of Patent: Sep. 14, 2021

(54) SURFACING SHARING ATTRIBUTES OF A LINK PROXIMATE A BROWSER ADDRESS BAR

(71) Applicant: Microsoft Technology Licensing, LLC, Redmond, WA (US)

(72) Inventors: Rafael Lopez-Uricoechea, Seattle, WA (US); Eugene S. Lin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/599,294

(22) Filed: Oct. 11, 2019

(65) Prior Publication Data

US 2021/0112112 A1    Apr. 15, 2021

(51) Int. Cl.
*G06F 15/16* (2006.01)
*H04L 29/08* (2006.01)
*G06F 16/958* (2019.01)
*G06F 16/957* (2019.01)
*H04L 29/06* (2006.01)

(52) U.S. Cl.
CPC ........... *H04L 67/02* (2013.01); *G06F 16/957* (2019.01); *G06F 16/958* (2019.01); *H04L 29/0809* (2013.01); *H04L 67/1097* (2013.01); *H04L 67/42* (2013.01)

(58) Field of Classification Search
CPC ..... G06F 16/958; G06F 16/957; H04L 67/02; H04L 29/0809; H04L 67/1097; H04L 67/42
See application file for complete search history.

(56) References Cited

U.S. PATENT DOCUMENTS

| 1,004,804 | A   | * | 10/1911 | McLaughlin et al. . | B65G 33/00 198/670 |
| 7,594,193 | B2  | * | 9/2009  | Thomas ............... | G06F 16/9535 715/835 |
| 10,044,804 | B2 |   | 8/2018  | Paulsami et al. | |
| 10,095,798 | B2 | * | 10/2018 | Zhu ..................... | H04L 63/1483 |
| 2012/0066634 | A1 | * | 3/2012 | Kim ..................... | G06F 16/9535 715/777 |

(Continued)

FOREIGN PATENT DOCUMENTS

| WO | 2012164316 A1 | 12/2012 |
| WO | 2013036488 A2 | 3/2013 |
| WO | 2018217357 A1 | 11/2018 |

OTHER PUBLICATIONS

"Box Drive Icons", Retrieved from: https://support.csuchico.edu/TDClient/KB/ArticleDet?ID=49538, Retrieved Date: Aug. 27, 2019, 3 Pages.

(Continued)

*Primary Examiner* — Thanh T Nguyen
(74) *Attorney, Agent, or Firm* — Christopher J. Volkmann; Kelly, Holt & Christenson, PLLC

(57) ABSTRACT

A browser on a client device is navigated to a hosting computing system that hosts a service that provides access to documents. The browser is navigated to a particular document, to access the document. The document is displayed by the browser. A link to the document is displayed in an address bar generated by the browser, along with a graphical element indicative of the sharing attributes corresponding to the link.

20 Claims, 9 Drawing Sheets

(56) References Cited

U.S. PATENT DOCUMENTS

| | | | |
|---|---|---|---|
| 2012/0317239 A1* | 12/2012 | Mulder | H04L 9/0861 709/219 |
| 2016/0156576 A1* | 6/2016 | Jeng | H04L 67/42 709/206 |
| 2019/0108114 A1* | 4/2019 | De Vansa Vikramaratne | G06F 16/9024 |

OTHER PUBLICATIONS

"Easiest way to get file ID from URL on Google Apps Script", Retrieved from: https://web.archive.org/web/20161124031730/https:/stackoverflow.com/questions/16840038/easiest-way-to-get-file-id-from-url-on-google-apps-script, Nov. 24, 2016, 5 Pages.

"Opinion—What does the Green Padlock Really Mean?", Retrieved from: https://www.tunetheweb.com/blog/what-does-the-green-padlock-really-mean/, Jan. 27, 2016, 7 Pages.

Hoffman, Chris, "Why Does Google Chrome Say Websites Are "Not Secure"?", Retrieved from: https://web.archive.org/web/20181223175250/https:/www.howtogeek.com/359298/why-does-google-chrome-say-websites-are-"not-secure"/, Dec. 23, 2018, 7 Pages.

"International Search Report and Written Opinion Issued in PCT Application No. PCT/US20/051373", dated Dec. 3, 2020, 11 Pages.

\* cited by examiner

SURFACING SHARING ATTRIBUTES OF A LINK PROXIMATE A BROWSER ADDRESS BAR

BACKGROUND

Computing systems are currently in wide use. Some computing system host services that provide access to documents that are stored in a remote server environment, such as the cloud.

In such systems, a client computing system or a user computing system runs a browser. A user can navigate the browser to the service, to access a particular document to which the hosted service provides access.

When a user navigates a browser in this way, and accesses a document, the browser displays the document and also displays an address of (or link to) the document in an address bar that is generated by the browser. It is not uncommon for a user to then wish to share the document with another user. The user often copies the link from the address bar and pastes it in a message (such as an electronic mail message, an SMS message, or another type of message) and sends it to the recipient with whom the user wishes to share the document. The link can be shared in other ways as well.

The discussion above is merely provided for general background information and is not intended to be used as an aid in determining the scope of the claimed subject matter.

SUMMARY

A browser on a client device is navigated to a hosting computing system that hosts a service that provides access to documents. The browser is navigated to a particular document, to access the document. The document is displayed by the browser. A link to the document is displayed in an address bar generated by the browser, along with a graphical element indicative of the sharing attributes corresponding to the link.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it is not uncommon for a user who is accessing a document on a remote server, using a browser, to copy and paste the link to the document into a message, so that the document can be shared with other users. The link can be shared in other ways as well. However, links often have different sharing attributes that define where the link can successfully be shared and used. For instance, some links may have sharing attributes that allow them to be shared and used by anyone, with many different users, on many different computing systems. Other links have attributes which only allow them to be shared and used within an organization, within a team, or within a specific set of other users. Thus, when a link is shared with a computing system or a user who is not able to use the link (as defined by its sharing attributes), the link will not work for the recipient.

In some systems, the link attributes can be discovered by navigating through a link configuration user experience where the link attributes can be viewed, and sometimes modified. However, there is currently no way for a user to identify the link attributes of a link, simply by viewing the link in the address bar of the browser. The present description thus proceeds with respect to a system in which a user can navigate a browser to access a particular document in a remote server architecture. The browser displays a link to the document that is being accessed, in the address bar, and it also displays a graphical element, closely proximate the address bar (or in the address bar) that is indicative of the sharing attributes corresponding to the link.

Figure 1:
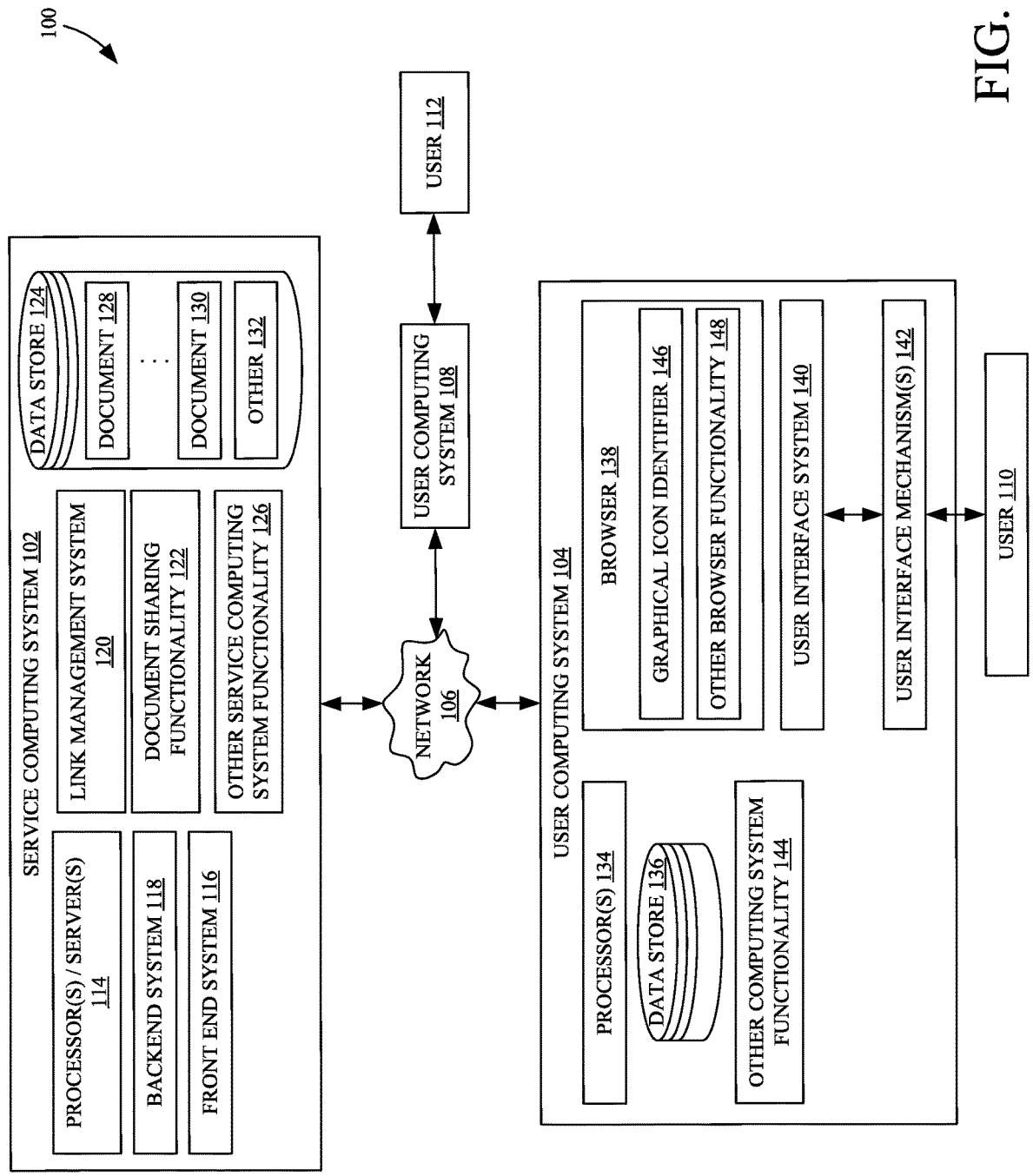
FIG. 1 is a block diagram of one example of a computing system architecture.

FIG. 1 is a block diagram of one example of a computing system architecture 100. Architecture 100 shows a service computing system 102 that can be accessed by user computing systems 104 and 108 over a network 106. Therefore, network 106 can be a wide variety of different types of networks, such as a local area network, a wide area network, a near field communication network, a cellular communication network, or any of a wide variety of other networks or combinations of networks.

User 110 illustratively interacts with user computing system 104 to control and manipulate user computing system 104, and some parts of service computing system 102. Similarly, user 112 can interact with user computing system 108 in order to control and manipulate user computing system 108 and some parts of service computing system 102.

In the example shown in FIG. 1, service computing system 102 can include a number of processors or servers 114, front end system 116, back end system 118, link management system 120, document sharing functionality 122, data store 124, and it can include a wide variety of other service computing system functionality 126. In one example, service computing system 102 hosts a service that provides access to documents 128-130, in data store 124. Data store 124 can include a wide variety of other items 132 as well.

User computing system 104 can include one or more processors 134, data store 136, browser 138, user interface system 140, user interface mechanism 142, and it can include a wide variety of other computing system functionality 144. Browser 138 is shown with graphical icon identifier 146 and other browser functionality 148. Before describing the operation of architecture 100 in more detail, a brief description of some of the items in architecture 100, and their operation, will first be provided.

User computing system 104 and user computing system 108 can be similar or different. For the sake of the present discussion, it is assumed that they are similar, so that only user computing system 104 is described in more detail. In one example, user 110 uses user interface mechanisms 142 to launch browser 148. This is illustratively detected by user interface system 140, and an indication of the detected interaction is provided to browser 138, to launch it. User 110 may illustratively provide browser navigation inputs to navigate browser 138 to a document (e.g., document 128) in service computing system 102. In one example, front end system 116 exposes an interface that can be called by browser 138 in order to access document 128. Back end system 118 handles any interactions relative to document 128 (such as modifying it, deleting it, etc.).

When the document is being accessed by browser 138, it is displayed to user 110 on a user interface display. The user interface display illustratively includes an address window (or address bar) that displays a link to document 128. Link management system 120 illustratively generates the link and provides it through front end system 116 (and/or back end system 118) to browser 138 so that it can be displayed. Link management system 120 also illustratively identifies certain attributes of the link. The attributes can be sharing attributes, that indicate where the link can be shared, and still be operable. As discussed above, this can be a global attribute indicating that the link is not restricted in terms of who it will work for, and the particular computing systems it will work on. The attribute can be an organizational attribute indicting that the link will not work outside the organization that owns or controls the document 128. It may be another type of sharing attribute indicating that the link to document 128 will only work within a team, within a family, or with another set of identifiable recipients.

The link attributes can also identify the access rights that are provided with the link. The access rights can include such things as view only rights, edit rights, etc.

When link management system 120 provides the link to document 128, it also illustratively makes the link attributes available. Browser 138 then uses graphical icon identifier 146 to identify a graphical icon corresponding to the link attributes for the link that is displayed in the address bar of the user interface display generated by browser 138. The graphical icon may differ, based upon the sharing attributes and/or other link attributes.

If user 110 wishes to share the document with another user (e.g., user 112), it is not uncommon for user 110 to copy the link from the address bar displayed by browser 138 into a message (such as an email message, an SMS message, or another type of message) and attempt to share the document with user 112. The link can be shared other ways as well, such as by using document sharing functionality in service computing system 102. User 110 can provide an input indicating that he or she wishes to share the document to document sharing functionality 122. Document sharing functionality 122 illustratively manages the sharing of the link to the document. It can also maintain a record of who the document has been shared with, who shared it, among other things.

Therefore, browser 138 displays the graphical icon, identified by graphical icon identifier 146 based upon the link attributes, in visually close proximity to the link that is displayed in the address bar by browser 138. In one example, browser 138 displays the graphical icon adjacent the address bar or within the address bar, adjacent the link. These are examples only. In this way, user 110 can quickly determine whether the link is sharable (e.g., whether it will operate when shared) with user 112.

Figure 2A:
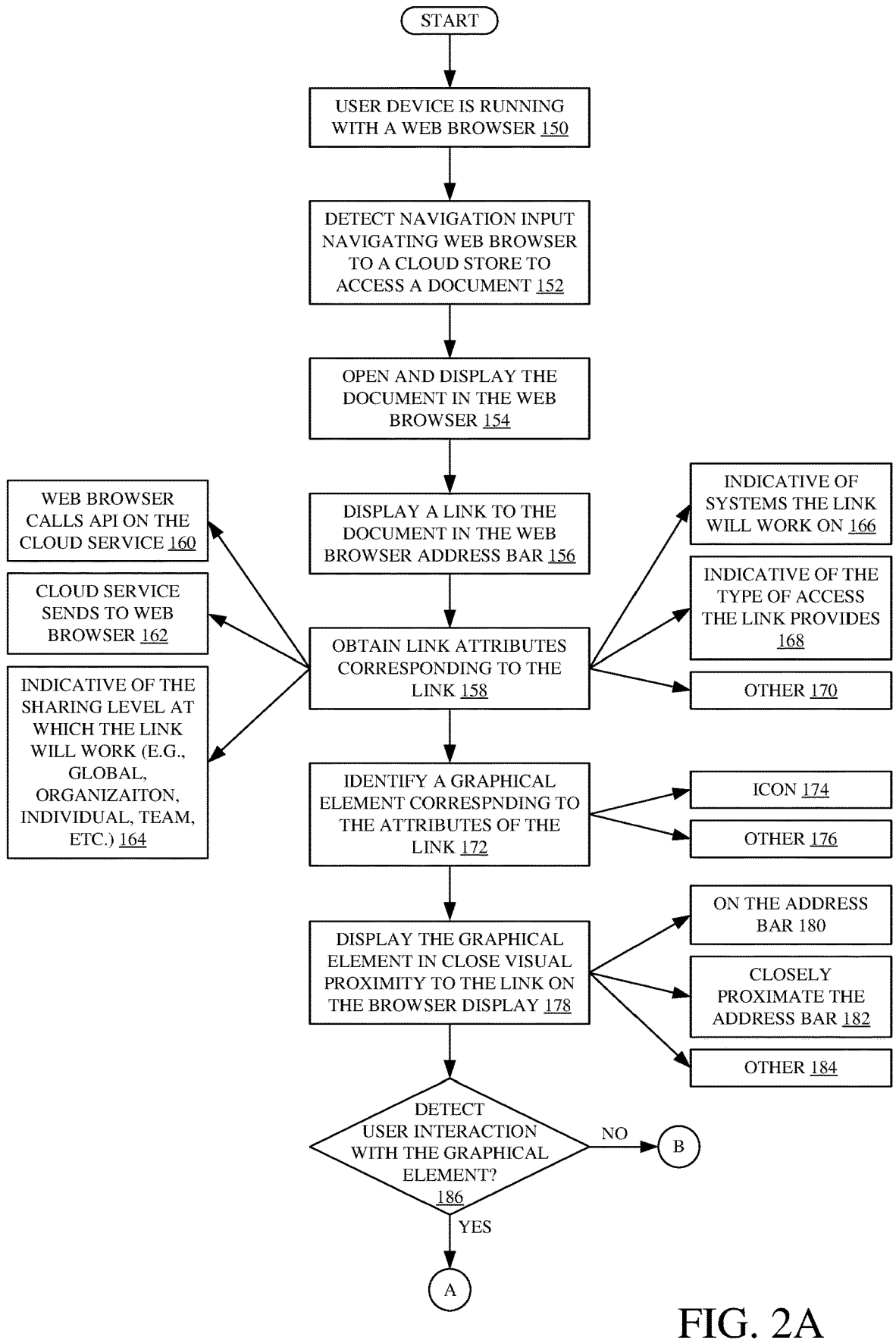
FIGS. 2A and 2B (collectively referred to herein as FIG. 2) show a flow diagram illustrating one example of the operation of the computing system architecture shown in FIG. 1, in displaying a document and a link to the document.
Figure 2B:
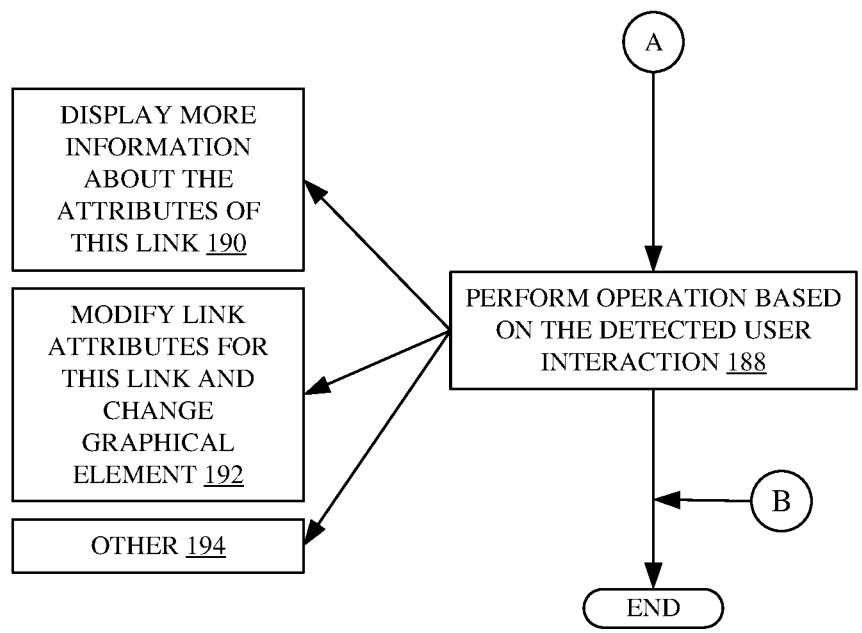

FIGS. 2A and 2B (collectively referred to herein as FIG. 2) show one example of a flow diagram illustrating the operation of architecture 100 (and specifically browser 138) in identifying a graphical icon corresponding to a link, and in displaying that graphical icon for access by user 110. It is first assumed that user computing system 104 is running on a user device with a web browser. This is indicated by block 150 in the flow diagram of FIG. 2. Browser 138 is launched and detects navigation inputs through user interface system 140 and user interface mechanisms 142. The navigation inputs navigate browser 138 to a cloud store to access a document (such as document 128 in service computing system 102). This is indicated by block 152. Browser 138 accesses document 128 and opens and displays the document in web browser 138. This is indicated by block 154.

Browser 138 displays a link to the document in the web browser address bar. This is indicated by block 156. Browser 138 then obtains the link attributes corresponding to the link to document 128. This is indicated by block 158, and it can be done in a variety of different ways. For instance, web browser 138 can call an API exposed by front end system 116 (or link management system 120) to obtain the link attributes. This is indicated by block 160. In another example, the cloud service can send the link attributes to web browser 138, without being asked. This can be done directly by link management system 120, by the service that uses front end system 116, or otherwise. The link attributes can be sent along with the link or separately. Sending the link attributes to web server 138 is indicated by block 162.

As discussed above, the link attributes can be indicative of a variety of different information corresponding to the link. For instance, they can be sharing attributes that are indicative of the sharing level at which the link will work (e.g., global, organizational, team, individual, etc.). This is indicated by block 164. The link attributes can be sharing attributes that are indicative of computing systems that the link will work on. This is indicated by block 166. The link attributes can be access attributes that are indicative of the type of access the link provides (e.g., read only, write, etc.). This is indicated by block 168. The link attributes can be obtained in other ways, and they can be indicative of other things as well. This is indicated by block 170.

Once the link attributes are received, browser 138 illustratively uses graphical icon identifier 146 to identify a graphical element corresponding to the link attributes of the link being displayed in the address bar. This is indicated by block 172 in the flow diagram of FIG. 2. The graphical element can be an icon 174, or any of a wide variety of other graphical elements corresponding to the link attributes. This is indicated by block 176. The graphical element can be identified by accessing a set of rules that map link attributes to graphical icons or in other ways.

Browser 138 then uses user interface system 140 to display the graphical element in close visual proximity to the link on the web browser user interface display (e.g., in close visual proximity to the address bar). This is indicated by block 178. In one example, browser 138 displays the graphical element on the address bar, adjacent the link. This is indicated by block 180. In another example, browser 138 displays the graphical element closely proximate the address bar, but not on the address bar itself. This is indicated by block 182. Browser 138 can display the graphical element in other ways as well. This is indicated by block 184.

In some examples, it may be that user 110 is unfamiliar with the particular graphical element being displayed. In another example, it may be that user 110 wishes to change the link attributes of the displayed link. Therefore, in one example, browser 138 displays the graphical element in an interactive form so that user 110 can interact with it using user interface mechanisms 142. For instance, the user may be able to actuate it by clicking on it with a point and click device, by using a touch gesture, etc. If the user does interact with the graphical element, this is detected by user interface system 140. Detecting user interaction with a graphical element is indicated by block 186 in the flow diagram of FIG. 2. An indication of the user interaction with the graphical element is provided to browser 138. Browser 138 can, in turn, provide it to link management system 120, or to other items.

Browser 138 (or link management system 120 or another item) then performs one or more operations based upon the detected user interaction with the graphical element. This is indicated by block 188. The operations performed based upon the user interaction can take a variety of different forms. For instance, browser 138 may obtain and display more information about the link attributes corresponding to the link. For instance, it may provide a textual description of the sharing attributes represented by the graphical element. Displaying more information about the link attributes based on user interaction with the graphical element is indicated by block 190 in the flow diagram of FIG. 2.

It may also be that browser 138 modifies the link attributes corresponding to the link based on the user interaction. For instance, it may be that the user has authority to change the sharing attributes corresponding to the link so that the link may be more widely, or more narrowly, shared. In that case, when the user actuates the graphical element, the browser 138 (or link management system 120 or another component) guides the user through a user experience that allows user 110 to change the sharing attributes. Once the attributes are changed, it may be that graphical icon identifier 146 then needs to identify a different graphical icon that is consistent with the modified link attributes. In one example, it does that and browser 138 then changes the graphical element displayed visually proximate the link so that it represents the newly modified link attributes.

Modifying the link attributes for the link, and changing the graphical element, is indicated by block 192 in the flow diagram of FIG. 2. A wide variety of other operations can be performed based on detected user interaction with a graphical element as well. This is indicated by block 194.

Figure 3:
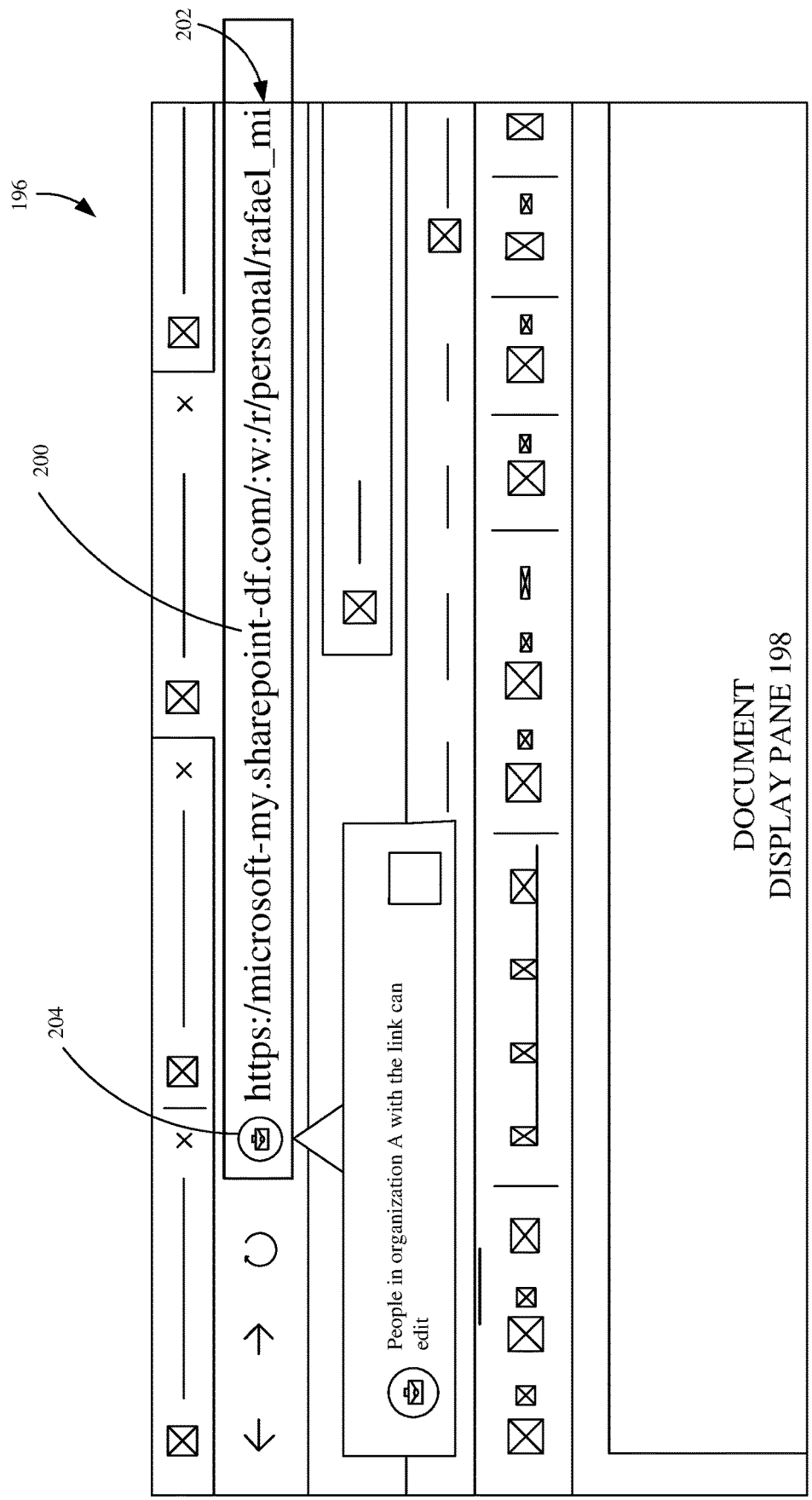
FIG. 3 shows one example of a user interface display that can be generated by a browser, in accordance with one example.

FIG. 3 shows one example of a part of a user interface display 196 that can be generated by browser 138 when user 110 navigates to a particular document 128. The document can be displayed in a document display pane 198. The link 200 to the document can be displayed in an address bar 202. Similarly, the graphical element corresponding to link 200 is also shown, in the example illustrated in FIG. 3, as graphical element 204, and it is displayed along with link 200 in address bar 202.

FIG. 3 also shows an example in which user 110 has interacted with graphical element 204. In the example shown in FIG. 3, user 110 has navigated a cursor so that it is hovering over graphical element 204, or user 110 has actually actuated graphical element 204 by clicking on it, tapping on it using a touch gesture, etc.

The user interaction is detected, and it causes browser 138 to obtain and display additional information 206. In the example shown in FIG. 3, the additional information describes the attributes of the link by indicating that people in a particular organization can use the link to edit the document. Thus, the additional information 206, in the example shown in FIG. 3, not only describes where the link will work, but the particular access permissions that are provided along with the link.

It can thus be seen that the subject matter of the present discussion greatly improves the operation of the computing system itself. The computing system need not navigate the user through a link management experience in order for the user to know the sharing attributes corresponding to the link. Similarly, the user need not use trial and error to find out who the link will work for. This saves computing overhead and network bandwidth. Similarly, this greatly enhances the user experience, because the user can quickly and easily identify the sharing attributes (and other attributes) corresponding to the link that is being displayed.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
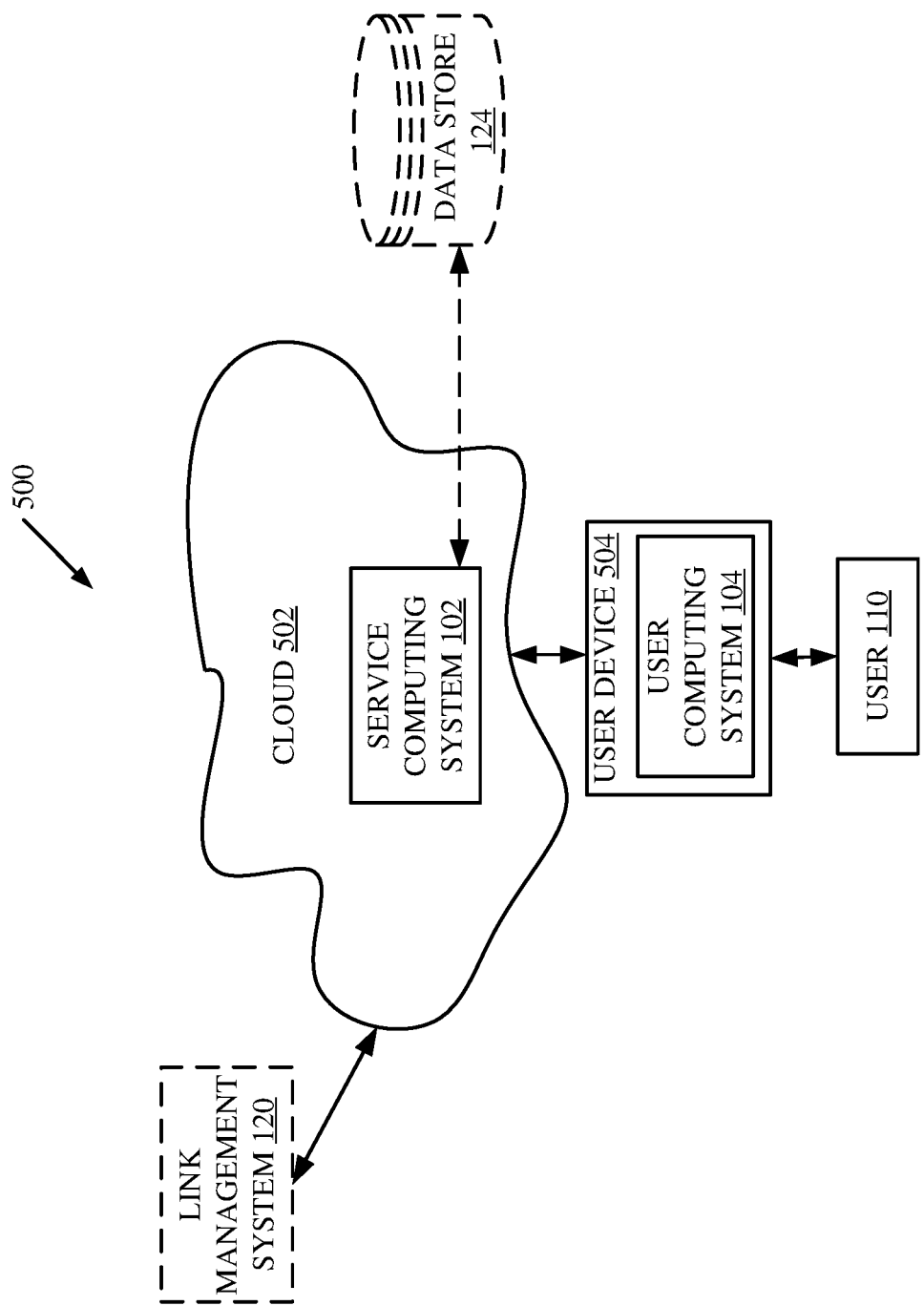
FIG. 4 is a block diagram showing one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that service computing system 102 can be located in cloud 502 (which can be public, private, or a combination where portions are public while others are private). Therefore, user 110 uses a user device 504 (with user computing system 104) to access those systems through cloud 502.

FIG. 4 also depicts another example of a cloud architecture. FIG. 4 shows that it is also contemplated that some elements of computing system 102 can be disposed in cloud 502 while others are not. By way of example, data store 124 can be disposed outside of cloud 502, and accessed through cloud 502. In another example, link management system 120 (or other items) can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
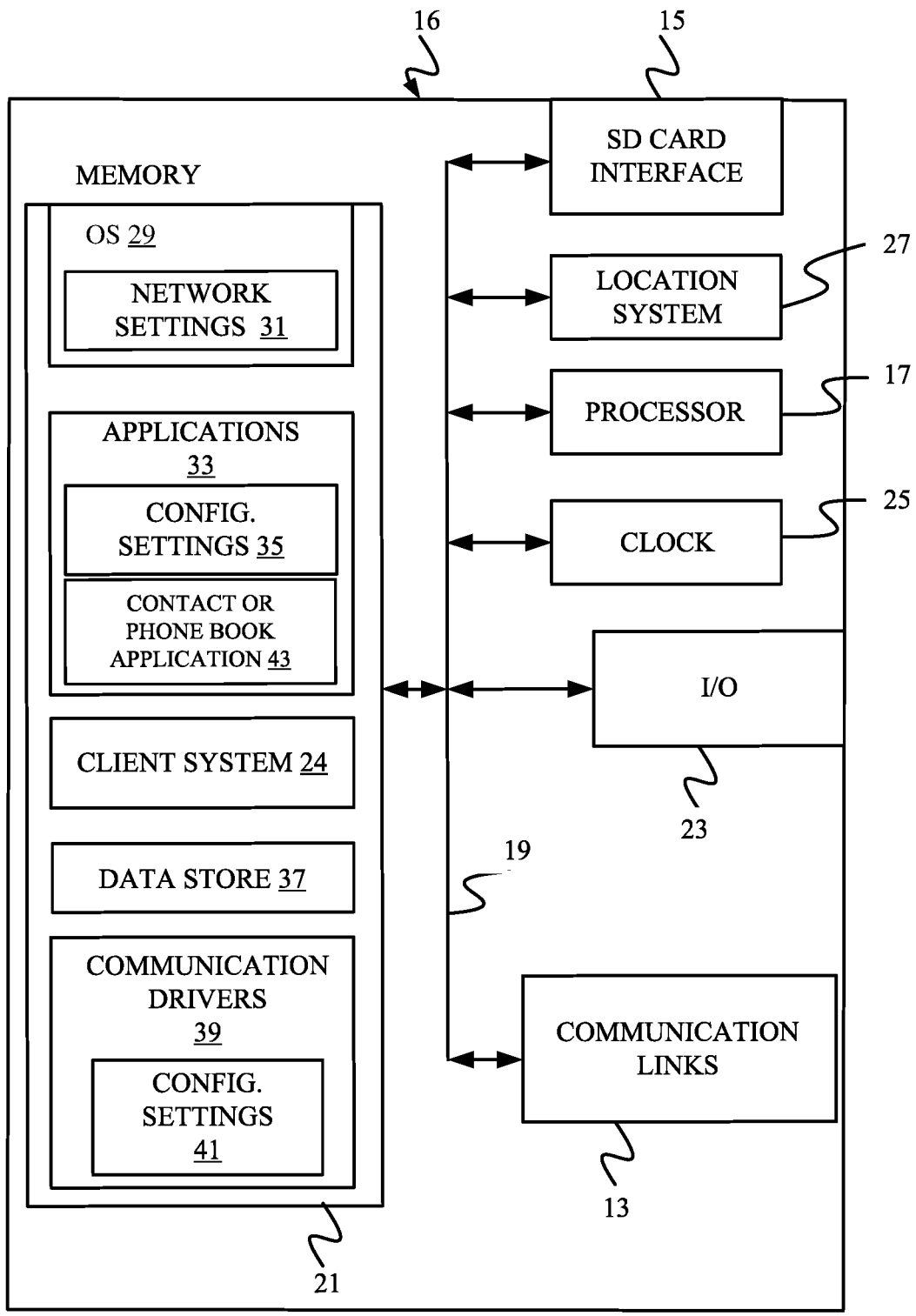
FIGS. 5-7 show examples of mobile devices that can be used in the architectures shown in the previous figures.
Figure 6:
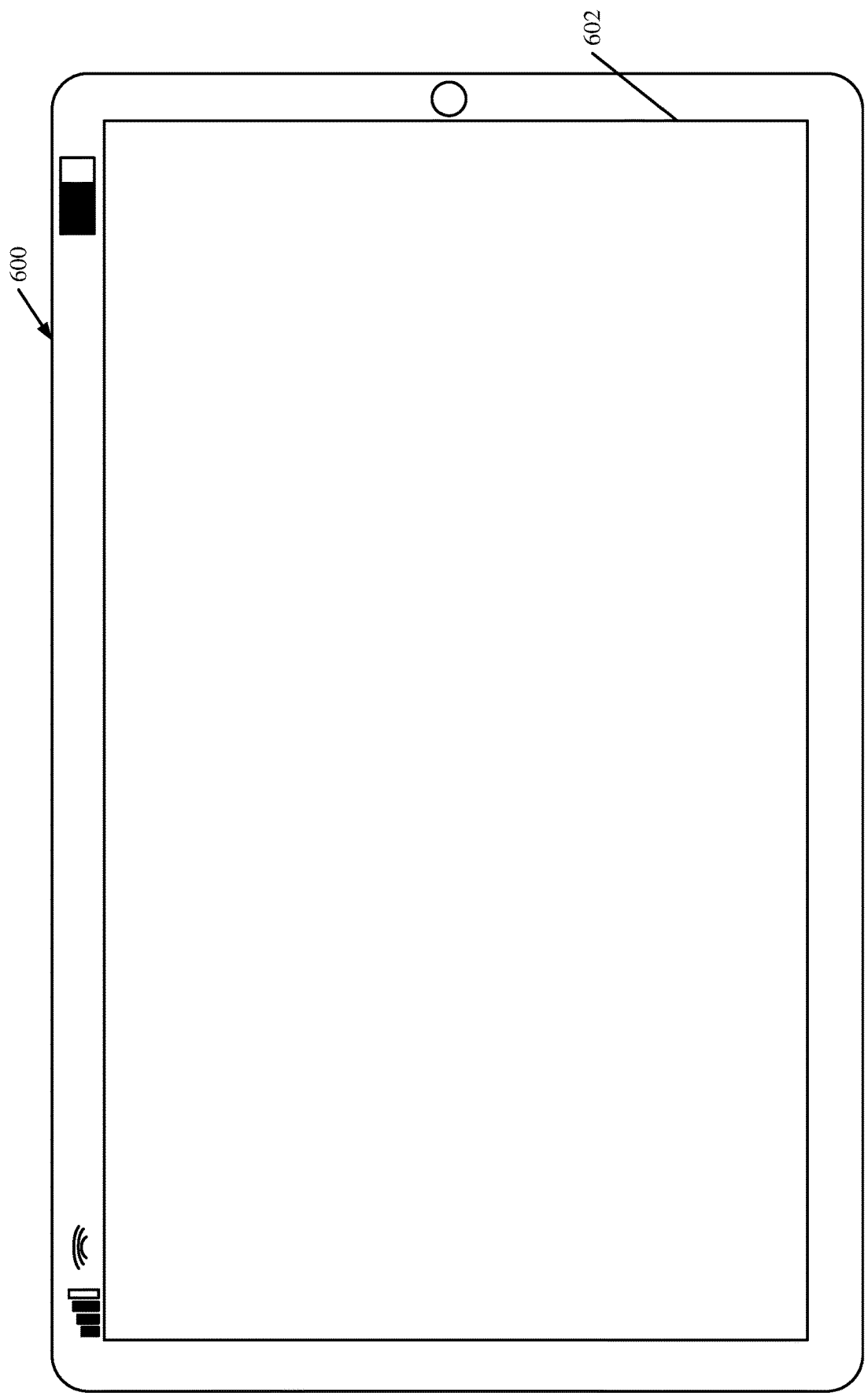
Figure 7:
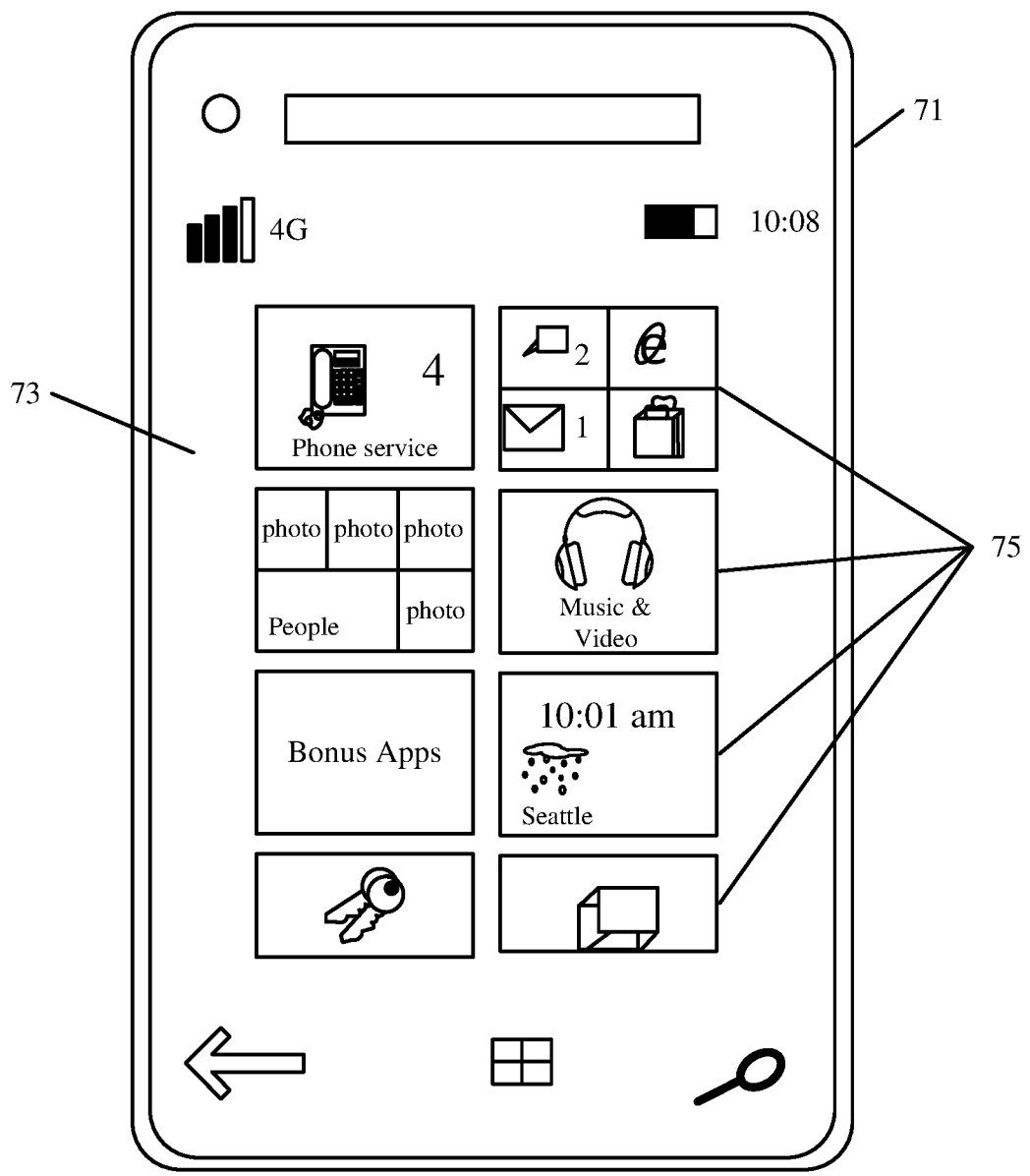

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components computing system 102 or user device 504 or system 116 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can include browser 138, and be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
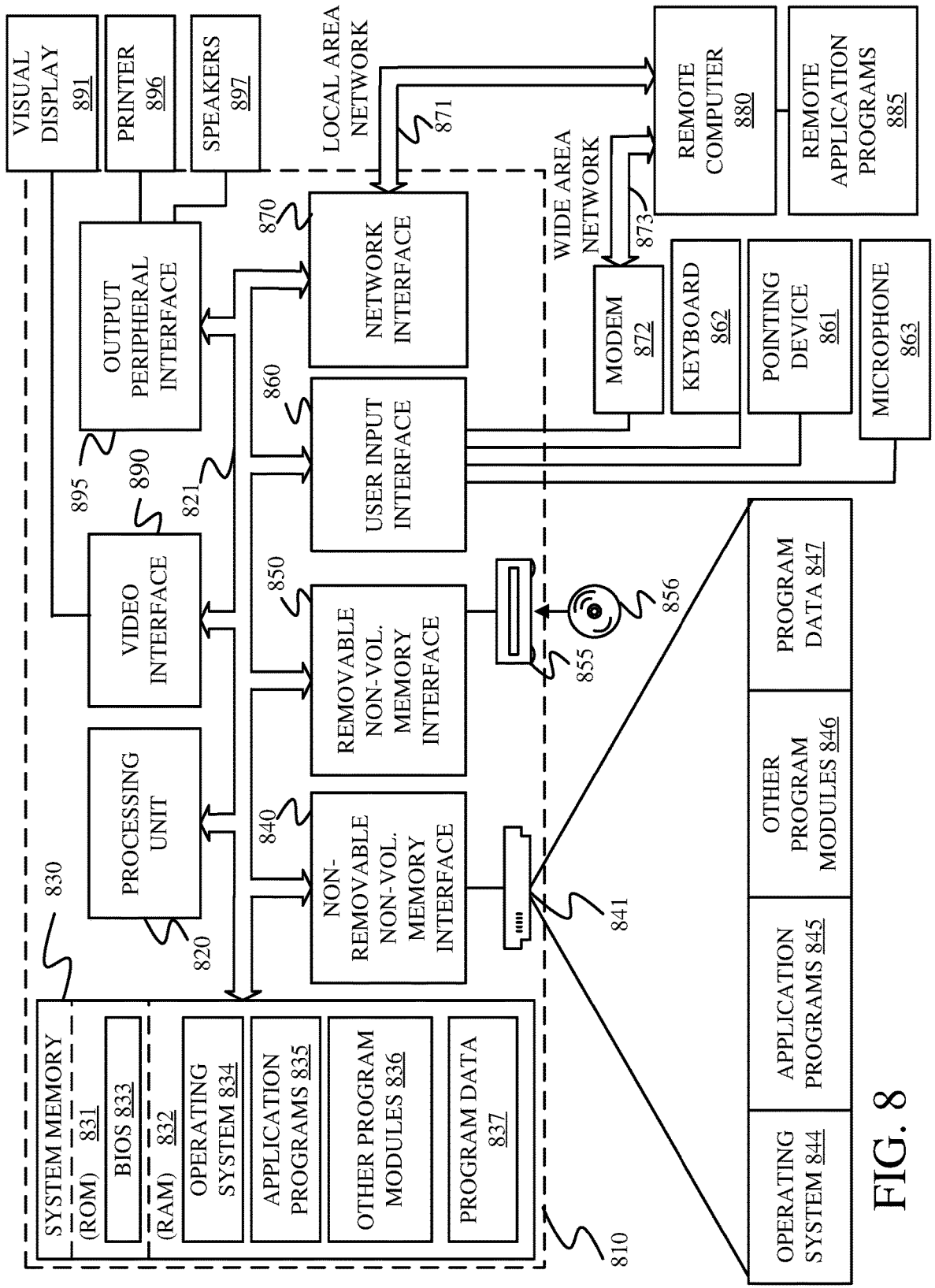
FIG. 8 is a block diagram showing one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a general-purpose computing device in the form of a computer 810 programmed and/or otherwise configured to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer implemented method, comprising:
obtaining access to a document, stored on a remote server system, through a web browser;
displaying, on a web browser user interface, a portion of the document;
displaying a link to the document on the web browser user interface;
obtaining a set of sharing attributes corresponding to the link; and
displaying a graphical element on the web browser user interface, along with the link, based on the sharing attributes.

Example 2 is the computer implemented method of any or all previous examples wherein obtaining the set of sharing attributes comprises:
calling the remote server system to obtain the set of sharing attributes.

Example 3 is the computer implemented method of any or all previous examples wherein obtaining the set of sharing attributes comprises:
receiving the link and the set of sharing attributes from the remote server system.

Example 4 is the computer implemented method of any or all previous examples wherein displaying a link comprises:
displaying the link in an address bar on the web browser user interface; and
displaying a graphical element comprises displaying the graphical element closely proximate the address bar.

Example 5 is the computer implemented method of any or all previous examples wherein displaying the graphical element comprises:
displaying the graphical element, along with the link, in the address bar in the web browser user interface.

Example 6 is the computer implemented method of any or all previous examples wherein displaying the graphical element, along with the link, in the address bar comprises:
displaying the graphical element as an interactive graphical element;
detecting user interaction with the interactive graphical element; and
performing an action based on the detected user interaction.

Example 7 is the computer implemented method of any or all previous examples wherein performing an action based on the detected user interaction comprises:
displaying, proximate the interactive graphical element on the web browser user interface, a description of the sharing attributes corresponding to the graphical element.

Example 8 is the computer implemented method of any or all previous examples wherein performing an action based on the detected user interaction comprises:
displaying an actuatable attribute modification user interface to change the sharing attributes; and
detecting user actuation of the actuatable attribute modification user interface to identify a set of modified sharing attributes corresponding to the link.

Example 9 is the computer implemented method of any or all previous examples wherein performing an action based on the detected user interaction further comprises:
obtaining a different graphical element corresponding to the set of modified sharing attributes; and
displaying the different graphical element along with the link on the web browser user interface.

Example 10 is a computer system, comprising:
at least one processor; and
memory storing instructions which, when executed by the at least one processor, causes the at least one processor to perform steps comprising:
navigating to a document, stored on a remote server system, with a web browser;
displaying, on a web browser user interface, a portion of the document;
displaying a link to the document on the web browser user interface;
obtaining a set of sharing attributes corresponding to the link;
identifying a user actuatable graphical element based on the set of sharing attributes corresponding to the link; and
displaying the user actuatable graphical element on the web browser user interface, along with the link, based on sharing attributes corresponding to the link.

Example 11 is the computer system of any or all previous examples wherein displaying a link to the document comprises:

displaying an address bar on the web browser user interface; and displaying the link in the address bar on the web browser user interface.

Example 12 is the computer system of any or all previous examples wherein displaying the user actuatable graphical element comprises:

displaying the user actuatable graphical element, along with the link, in the address bar on the web browser user interface.

Example 13 is a computer system, comprising:

at least one processor; and memory storing instructions which, when executed by the at least one processor, causes the at least one processor to perform steps comprising:

navigating to a document, stored on a remote server system, with a web browser;

displaying, on a web browser user interface, a portion of the document;

displaying a link to the document on the web browser user interface; and displaying a graphical element on the web browser user interface, along with the link, based on sharing attributes corresponding to the link.

Example 14 is the computer system of any or all previous examples and further comprising:

calling the remote server system to obtain the set of sharing attributes.

Example 15 is the computer system of any or all previous examples and further comprising:

receiving the link and the set of sharing attributes from the remote server system.

Example 16 is the computer system of any or all previous examples wherein displaying a link to the document comprises:

displaying an address bar on the web browser user interface; and displaying the link in the address bar on the web browser user interface.

Example 17 is the computer system of any or all previous examples wherein displaying the graphical element comprises:

displaying the graphical element, along with the link, in the address bar in the web browser user interface.

Example 18 is the computer system of any or all previous examples wherein displaying the graphical element, along with the link, in the address bar comprises:

displaying the graphical element as an interactive graphical element;

detecting user interaction with the interactive graphical element; and performing an action based on the detected user interaction.

Example 19 is the computer system of any or all previous examples wherein performing an action based on the detected user interaction comprises:

displaying, proximate the interactive graphical element on the web browser user interface, a description of the sharing attributes corresponding to the graphical element.

Example 20 is the computer system of any or all previous examples wherein performing an action based on the detected user interaction comprises:

displaying an actuatable attribute modification user interface to change the sharing attributes;

detecting user actuation of the actuatable attribute modification user interface to identify a set of modified sharing attributes corresponding to the link;

obtaining a different graphical element corresponding to the set of modified sharing attributes; and displaying the different graphical element along with the link on the web browser user interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:

obtaining access to a document, stored on a remote server system, through a web browser;

displaying, to a user on a web browser user interface, a portion of the document;

displaying a link to the document on the web browser user interface;

obtaining a sharing attribute corresponding to the link, the sharing attribute representing a link usage permission for another user to access the document using the link; and displaying a graphical element on the web browser user interface, along with the link, based on the sharing attribute.

2. The computer implemented method of claim 1 wherein obtaining the sharing attribute comprises:

calling the remote server system to obtain the sharing attribute; and receiving the link and the sharing attribute from the remote server system.

3. The computer implemented method of claim 1 wherein the graphical element comprises a graphical icon, selected from a plurality of graphical icon, based on the sharing attribute.

4. The computer implemented method of claim 1 wherein displaying a link comprises displaying the link in an address bar on the web browser user interface; and displaying a graphical element comprises displaying the graphical element closely proximate the address bar.

5. The computer implemented method of claim 4 wherein displaying the graphical element comprises:

displaying the graphical element, along with the link, in the address bar in the web browser user interface.

6. The computer implemented method of claim 5 and further comprising:

generating the graphical element as an interactive graphical element;

detecting user interaction with the interactive graphical element; and performing an action based on the detected user interaction.

7. The computer implemented method of claim 6 wherein performing an action based on the detected user interaction comprises:

displaying, proximate the interactive graphical element on the web browser user interface, a description of the sharing attribute corresponding to the graphical element.

8. The computer implemented method of claim 6 wherein performing an action based on the detected user interaction comprises:

displaying an actuatable attribute modification user interface to change the sharing attribute; and detecting user actuation of the actuatable attribute modification user interface to identify a modified sharing attribute corresponding to the link.

9. The computer implemented method of claim 8 wherein performing an action based on the detected user interaction further comprises:
obtaining a different graphical element corresponding to the modified sharing attribute; and
displaying the different graphical element along with the link on the web browser user interface.

10. A computer system, comprising:
at least one processor; and
memory storing instructions which, when executed by the at least one processor, causes the at least one processor to:
based on an input associated with a user through a web browser, navigate to a document stored on a remote server system;
generate a web browser user interface that includes:
a portion of the document; and
a link to the document;
obtain a sharing attribute corresponding to the link, the sharing attribute representing a link usage permission for another user to access the document using the link;
identify a user actuatable graphical element based on the sharing attribute corresponding to the link; and
generate the user actuatable graphical element on the web browser user interface.

11. The computer system of claim 10 wherein the web browser user interface comprises an address bar that includes the link.

12. The computer system of claim 11 wherein the user actuatable graphical element is generated element in the address bar, along with the link, on the web browser user interface.

13. A computer system, comprising:
at least one processor; and
memory storing instructions which, when executed by the at least one processor, cause the computer system to:
navigate, for a user, to a document, stored on a remote server system, with a web browser;
generate a web browser user interface that includes:
a portion of the document; and
a link to the document;
identify a link usage permission for another user to access the document using the link; and display a graphical element that represents the link usage permission.

14. The computer system of claim 13 wherein the instructions cause the computer system to:
call the remote server system to obtain the usage permission.

15. The computer system of claim 13 wherein the instructions cause the computer system to:
receive the link and the usage permission from the remote server system.

16. The computer system of claim 13 wherein the web browser user interface comprises:
an address bar that includes the link.

17. The computer system of claim 16 wherein the address bar in the web browser user interface includes the graphical element.

18. The computer system of claim 17 wherein the graphical element, comprises an interactive graphical element, wherein the instructions cause the computer system to:
detect user interaction with the interactive graphical element; and
perform action based on the detected user interaction.

19. The computer system of claim 18 wherein the instructions cause the computer system to: generate a description of the link usage permission proximate the interactive graphical element on the web browser user interface.

20. The computer system of claim 18 wherein the instructions cause the computer system to:
generate an actuatable attribute modification user interface;
based on actuation of the actuatable attribute modification user interface, identify a set of modified sharing attributes corresponding to the link;
obtain a different graphical element corresponding to the set of modified sharing attributes;
and modify the web browser user interface to include the different graphical element along with the link.

* * * * *